(12) United States Patent
Zhang et al.

(10) Patent No.: US 8,962,821 B2
(45) Date of Patent: Feb. 24, 2015

(54) METHOD FOR PREPARING REGENERATED CELLULOSE FIBER BY TWO-STEP COAGULATING BATH PROCESS

(75) Inventors: Lina Zhang, Wuhan (CN); Jie Cai, Wuhan (CN); Jinping Zhou, Wuhan (CN); Chuntao Li, Hai'An (CN); Haisong Qi, Wuhan (CN); Yuan Mao, Wuhan (CN)

(73) Assignees: Jiangsu Long-Ma Green Fibers Co., Ltd., Jiangsu Province (CN); Wuhan University, Hubei Province (CN)

( * ) Notice: Subject to any disclaimer, the term of this patent is extended or adjusted under 35 U.S.C. 154(b) by 1068 days.

(21) Appl. No.: 11/916,020

(22) PCT Filed: Apr. 21, 2006

(86) PCT No.: PCT/CN2006/000757
§ 371 (c)(1),
(2), (4) Date: Mar. 19, 2008

(87) PCT Pub. No.: WO2006/128346
PCT Pub. Date: Dec. 7, 2006

(65) Prior Publication Data
US 2008/0275231 A1    Nov. 6, 2008

(30) Foreign Application Priority Data

May 30, 2005   (CN) .......................... 2005 1 0018799

(51) Int. Cl.
| | | |
|---|---|---|
| C08B 1/00 | (2006.01) | |
| C07H 1/00 | (2006.01) | |
| D01F 2/02 | (2006.01) | |
| D01D 5/06 | (2006.01) | |
| D01F 1/10 | (2006.01) | |

(52) U.S. Cl.
CPC . D01F 2/02 (2013.01); C08B 1/003 (2013.01); D01D 5/06 (2013.01); D01F 1/10 (2013.01)
USPC ............... 536/30; 536/55.3; 536/56; 536/124

(58) Field of Classification Search
CPC .................................... C08B 1/00; C07H 1/00
USPC ...................... 536/30, 55.3, 56, 124
See application file for complete search history.

(56) References Cited

U.S. PATENT DOCUMENTS

| | | | | |
|---|---|---|---|---|
| 2,307,863 | A | * | 1/1943 | Soukup ..................... 264/196 |
| 4,526,620 | A | | 7/1985 | Selin et al. |
| 5,229,506 | A | * | 7/1993 | Rahman et al. ............... 536/30 |
| 2008/0071229 | A1 | | 3/2008 | Pudleiner et al. |

FOREIGN PATENT DOCUMENTS

| | | | |
|---|---|---|---|
| CN | 1318575 A | * | 10/2001 |
| CN | 1541227 | | 10/2004 |
| CN | 1613900 | * | 5/2005 |
| JP | 59115334 | | 7/1984 |
| JP | 60042401 | | 3/1985 |
| JP | 60199912 | | 10/1985 |
| JP | H01-501804 A | | 6/1989 |
| JP | H02-293405 A | | 12/1990 |
| JP | H09-509704 | | 9/1997 |
| JP | 2000096447 | | 4/2000 |
| JP | 2001501804 | | 2/2001 |
| JP | 2002293405 | | 10/2002 |
| JP | 2009509704 | | 3/2009 |

OTHER PUBLICATIONS

Kane (Abstract, JP 73030006 B, Japan, Sep. 1973).*
Kimura et al, JP 48030006, "Method for Manufactor in fiber of Regenerated cellulose", Published Sep. 17, 1973, English Language Translated Copy.*
Jie Cai et al: "Novel Fibers Prepared From Cellulose in NaOH/UREA Aqueous Solution" Macromolecular Rapid Communications, vol. 25, No. 17 (Sep. 9, 2004).
Liu et al., "Fiber Formation via Solution Spinning of the Cellulose/Ammonia/Ammonium Thiocyanate System", Journal of Polymer Science: Part B: Polymer Physics, vol. 29, pp. 181-196, 1991.

* cited by examiner

Primary Examiner — Patrick Lewis
Assistant Examiner — Everett White
(74) Attorney, Agent, or Firm — Workman Nydegger

(57) ABSTRACT

The present invention relates to a non-toxic process and system for pilot-scale production of cellulose products, and particularly to a process and system for pilot-scale production of cellulose products by using aqueous sodium hydroxide/urea solution pre-colled to lower than −8° C., in which cellulose could dissolved rapidly. The said process and system can be used to produce fibers, films, chromatographic packings, or nonwovens of regenerated cellulose, as well as to produce a variety of high added-value products by adding other materials such as functional materials, nano-materials, etc.

16 Claims, 3 Drawing Sheets

METHOD FOR PREPARING REGENERATED CELLULOSE FIBER BY TWO-STEP COAGULATING BATH PROCESS

The present application claims the benefit of the patent application No. 200510018799.8 filed with the State Intellectual Property Office of the People's Republic of China on May 30, 2005 by Wuhan University, which is incorporated herein by reference.

FIELD OF INVENTION

The present invention relates to a non-toxic process and system for pilot-scale production of cellulose products, and particularly to a process and system for pilot-scale production of cellulose products by using aqueous sodium hydroxide (NaOH)/urea solution. The said process and system can be used to produce fibers, films, chromatographic packings, or nonwovens of regenerated cellulose, as well as to produce a variety of high added-value products by adding other materials such as functional materials, nano-materials, etc. The present invention pertains to the field of natural macromolecules, and to the fields of material, textile, chemistry and chemical engineering, agriculture, and environmental engineering.

BACKGROUND OF THE INVENTION

Celluloses are the most abundant renewable resource on the earth are environmentally friendly materials, so sufficient utilization of celluloses can not only protect environment but also save the limited unrenewable petroleum resources. However, celluloses are far from being sufficiently utilized in chemical industry, mainly because the current processes for dissolving cellulose are complex, costly and tend to cause pollution.

In the past more than one hundred years, conventional viscose process has been used for producing regenerated cellulose products such as rayon, glassine paper and the like. The conventional viscose process comprises reacting cellulose with $CS_2$ (33 wt %) in the presence of strong base (the concentration of sodium hydroxide being 18 wt %) to produce cellulose xanthate that is dissolved in the alkaline solution to form a viscose solution, and then spinning or casting the viscose solution of cellulose, followed by regenerating in diluent acid solution to obtain viscose fiber (rayon) or glassine paper. A great quantity of toxic gases such as $CS_2$ and $H_2S$ which severely pollute environment are released during the process and are harmful to human health (J. Macromol. Sci.-Rev. Macromol. Chem., 1980, C18 (1), 1).

In the prior art, the cuprammonium process for producing cuprammonium rayon also has drawbacks of environmental pollution, high cost and difficulty to recover solution. The processes, in which other organic or inorganic solvents such as dimethylsulfoxide-nitrogen oxide (U.S. Pat. No. 3,236,669, 1966), aqueous $ZnCl_2$ solution (U.S. Pat. No. 5,290,349, 1994), LiCl/DMAc (U.S. Pat. No. 4,302,252, 1981) and the like are used, respectively, are difficult in industrialization due to the cost and their complicated dissolving procedures.

N-methylmorpholine oxide (NMMO) (U.S. Pat. No. 2,179,181, 1939; U.K. Patent No. GB1144048, 1967; U.S. Pat. No. 4,246,221, 1981) is considered as the most promising solvent for cellulose so far. In 1989, Bureau International pour la Standardisation des Fibres Artificielles (BISFA) in Brussels named such cellulose fibers made by NMMO process as "Lyocell". Although a small amount of products of cellulose fibers made thereby had been marketed, the industrial production of them developed slowly due to high cost and high spinning temperature.

In addition, a process has been proposed that comprises reacting cellulose with urea at high temperature to obtain cellulose carbamate, and then dissolving directly in a diluent alkaline solution to obtain spinning solution (Finland Patent No. F161003; Finland Patent No. F162318; U.S. Pat. No. 4,404,369). However, this process requires a great amount of urea, leads to side product(s), and is difficult for industrialization either.

Japan Patent No. JP1777283 disclosed that cellulose was dissolved in 2.5 mol/L aqueous NaOH solution, but only wood pulp cellulose having a polymerization degree of below 250 and being treated by vapor explosion could be used, which could be dissolved in such aqueous NaOH solution at about 4° C. The cellulose filaments made by using this process have a poor strength and are not suitable for spinning or forming film in industry.

The present applicant proposed in Chinese Patent No. 00114486.3 that a mixed aqueous solution of 4 wt %-8 wt % sodium hydroxide and 2 wt %-8 wt % urea was used as solvent for dissolving cellulose, and in Chinese Patent No. 00114485.5, a regenerated cellulose film with good strength was prepared successfully. However, the practices indicated that the solvent system must be kept under freezing condition (−20° C.) for 3-8 hours to form an ice-like stuff and then thawed before it was used to dissolve cellulose for preparing transparent cellulose solution. Thus, it is applicable to laboratory scale only at present, and is not suitable for industrialization.

In addition, the present applicant proposed in Chinese Patent No. 03128386.1 that a mixed aqueous solution of 5 wt %-12 wt % sodium hydroxide and 8.5 wt %-20 wt % urea was cooled and then was used for directly dissolving the natural cellulose having a molecular weight of less than $10.1 \times 10^4$ and the regenerated cellulose having a molecular weight of less than $12 \times 10^4$ at room temperature to obtain a transparent, concentrated cellulose solution; subsequently, in Chinese Patent No. 200310111566.3, regenerated cellulose fibers and films were prepared therefrom by using simple, compact laboratory device; and in Chinese Patent No. 200410013389.X, regenerated cellulose filaments were prepared by wet spinning process using spinning machine. However, since one-bath process is used in formation, the surface of filaments solidified quickly, which influenced the further stretch orientation, thereby resulting in relatively low filament strength.

SUMMARY OF THE INVENTION

One object of the present invention is to provide a process for pilot-scale production of cellulose products, the process comprising:

(a) Pre-cooling a mixed aqueous solution of sodium hydroxide and urea to a first temperature;

(b) Placing the pre-cooled mixed aqueous solution at a second temperature, then immediately adding a cellulose raw material which is thereby dissolved rapidly under agitation to obtain a cellulose solution;

(c) Filtering and deaerating the cellulose solution;

(d) Using a molding device for pilot-scale production to allow the filtered and deaerated cellulose solution to form a cellulose product.

According to the process of the present invention, in the mixed aqueous solution, the concentration of sodium hydroxide is 5.0 wt %~12.0 wt %, preferably 6.0 wt %~8.0 wt %, most preferably 7.0 wt %~7.5 wt %; the concentration of urea is 8.0 wt %~20.0 wt %, preferably 10.0 wt %~20.0 wt %, most preferably 11.0 wt %~12.0 wt %.

According to the process of the present invention, the said first temperature is in the range of −15° C. to −8° C., preferably in the range of −13° C. to −10° C., most preferably −12° C.

According to the process of the present invention, the said second temperature is ambient temperature, specifically in the range of 0° C.~20° C.

According to the process of the present invention, the said cellulose raw material can be of various cellulose pulps including cotton linter pulp, bagasse pulp, wood pulp, straw pulp, etc., particularly various cellulose pulps having a polymerization degree of below 700 and a relatively narrow distribution of molecular weight, preferably a cellulose pulp having a polymerization degree of 250~650, most preferably a cellulose pulp having a polymerization degree of 300~440. Preferably, the said cellulose pulp has a viscosity-average molecular weight of below $1.1 \times 10^5$.

According to the process of the present invention, after the cellulose raw material being added at the second temperature, the agitation is performed sufficiently for 10 minutes, preferably 15 minutes, and most preferably 20 minutes or more.

According to the process of the present invention, the deaerating time is preferably in the range of 4~30 hours, more preferably 4~10 hours, or alternatively, more preferably 10~30 hours.

According to the process of the present invention, the concentration of the resulting cellulose solution is in the range of 3.0 wt %~8.0 wt %, preferably 3.0 wt %~7.0 wt %, more preferably 4.5 wt %~5.5 wt %. It is preferred that with the increase of polymerization degree of the cellulose pulp from 250 to 650, the concentration of the cellulose solution is changed from 8.0 wt % to 4.0 wt %, and within such a range, the strength of the cellulose filaments can be enhanced by appropriately reducing molecular weight, maintaining relatively narrow distribution of molecular weight while increasing concentration.

According to the process of the present invention, the said molding device for pilot-scale production is selected from a variety of molding devices including spinning devices, film-forming devices, granulating devices, with a wet spinning device, more preferably a two-step coagulation bath spinning device, being preferred.

According to the process of the present invention, the process further comprises steps of producing a variety of high value-added cellulose products by adding other substances such as functional materials and/or nano-materials, wherein the said other substances can be added during the preparation of cellulose solution, or added by blending and molding with a functional master batch produced therefrom, or added by any other method known by those skilled in the art.

A further object of the present invention is to provide a system for pilot-scale production of cellulose products by using aqueous NaOH/urea solution, the system comprising a liquid storage tank, an agitating tank, a filtering device, a deaerating device and a molding device.

According to the system of the present invention, the temperature of each unit of the system is set according to the requirements of the corresponding steps.

According to the system of the present invention, the said molding device for pilot-scale production is selected from a variety of molding devices including spinning devices, film-forming devices, granulating devices, with a wet spinning device, more preferably a two-step coagulation bath spinning device, being preferred.

According to the system of the present invention, the said two-step coagulation bath spinning device comprises a first coagulation bath and a second coagulation bath. The said first coagulation bath is a mixed aqueous solution of $H_2SO_4$ and $Na_2SO_4$, wherein the concentration of $H_2SO_4$ is 5 wt %~20 wt %, preferably 6 wt %~15 wt %, and most preferably 7 wt %~9 wt %, the concentration of $Na_2SO_4$ is 5 wt %~25 wt %, preferably 10 wt %~25 wt %, and most preferably 10 wt %~15 wt %, and the bath temperature is 0~40° C., preferably 5~20° C., most preferably 10~15° C.; the said second coagulation bath is an aqueous $H_2SO_4$ solution with the concentration of $H_2SO_4$ being 3 wt %~20 wt %, preferably 3 wt %~10 wt %, and most preferably 4 wt %~5 wt %, and the bath temperature being 0~60° C., preferably 10~30° C., and most preferably 10~20° C.

According to the system of the present invention, the said cellulose solution, after being jetted out, enters into the first coagulation bath for solidification, partial stretch orientation and draft, and then enters into the second coagulation bath for further regeneration and stretch orientation.

According to the system of the present invention, the system further comprises a metering pump, a spinneret, a water-washing device, a plasticizing device, a drying device and/or a winding device, and can further comprise a circulation device for recycling coagulation baths and/or a recovery device for recovering urea. Among others, the spinneret can be vertical spinneret or horizontal spinneret, which can be adjusted or changed according to practical requirements.

A still further object of the present invention is to provide a cellulose product produced by using aqueous NaOH/urea solution, comprising filaments, chopped fibers, films, chromatographic packings and/or nonwovens. The said product can be used for production of a variety of high value-added cellulose products by adding other substances such as functional materials and/or nano-materials.

In an embodiment, the cellulose solution of the present invention is used for production of regenerated cellulose filaments by solidification and regeneration in a spinning device of two-step coagulation bath method, and is subsequently used for production of continuous fibers, chopped fibers, nonwovens, etc.

In a further embodiment, the cellulose solution of the present invention is used for production of regenerated cellulose films by using a film-forming device.

In a still further embodiment, the cellulose solution of the present invention is granulated by using a granulating device, and the resulted particles are used as chromatographic packings.

In an embodiment of the present invention, other substances such as functional materials, nano-materials, etc. can be added and/or dispersed in the cellulose solution of the present invention, thereby producing high added-value cellulose products.

As compared to the prior art, the advantage of the present invention lies in that: firstly, the chemical raw materials used are less costly and non-toxic, which are made available as a new solvent for cellulose by cooling at reduced temperature; secondly, a variety of high added-value cellulose products can be produced by employing the process of the present invention; thirdly, since $CS_2$ is not used in the production process, such regenerated cellulose products contain no sulfur (viscose fibers have a sulfur content of 10 g/kg) and are regenerated cellulose materials with very high safety; fourthly, during the production according to the process of the present invention, the dissolution of cellulose is the most fast for polymers, so the production cycle is short (30~40 hours), which is equivalent to ⅓ that of viscose process; and fifthly,

DESCRIPTION OF THE PREFERRED EMBODIMENTS

The present invention is further illustrated in detail in combination with the drawings and specific examples, but the present invention is not intended to be limited thereto.

Figure 1:
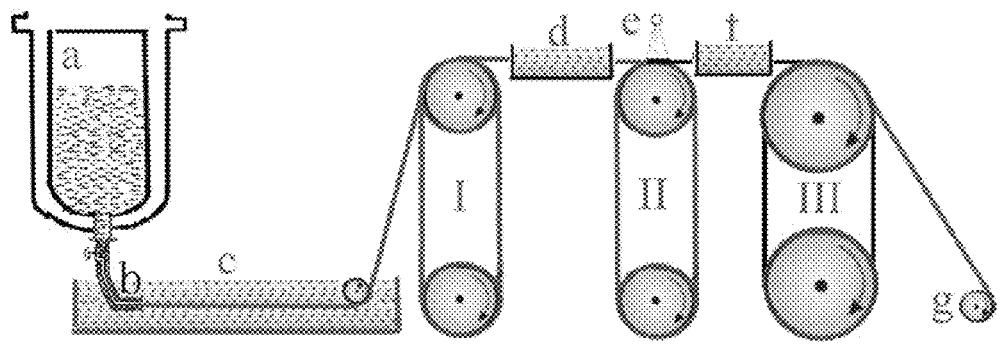
FIG. 1 shows a schematic diagram of a two-step coagulation bath spinning device for pilot-scale production according to the present invention.

In a preferred embodiment of the present invention, a device for pilot-scale production (FIG. 1) is used for wet spinning by the two-step coagulation bath method, wherein a cellulose solution is firstly deaerated by a deaerating tank a, and then, after being jetted out through a spinneret b, enters into a first coagulation bath tank c and subsequently, a second coagulation bath tank d in tow, followed by passing through a water-washing device e, and, as desired, being plasticized in a plasticizer tank f, and finally is drawn and wound by a winding device g to form a package. Preferably, the spinneret is reformed to spin downwardly so that cellulose molecules are stretched and oriented by gravity even when they are still in solution, and meanwhile the solidification time of cellulose is further prolonged and the stretch ratio is increased by arrangement of devices and process. Preferably, multi-stage stretch is employed to further enhance the strength of cellulose filaments, so that regenerated cellulose filaments with better mechanical properties are prepared.

Figure 2:
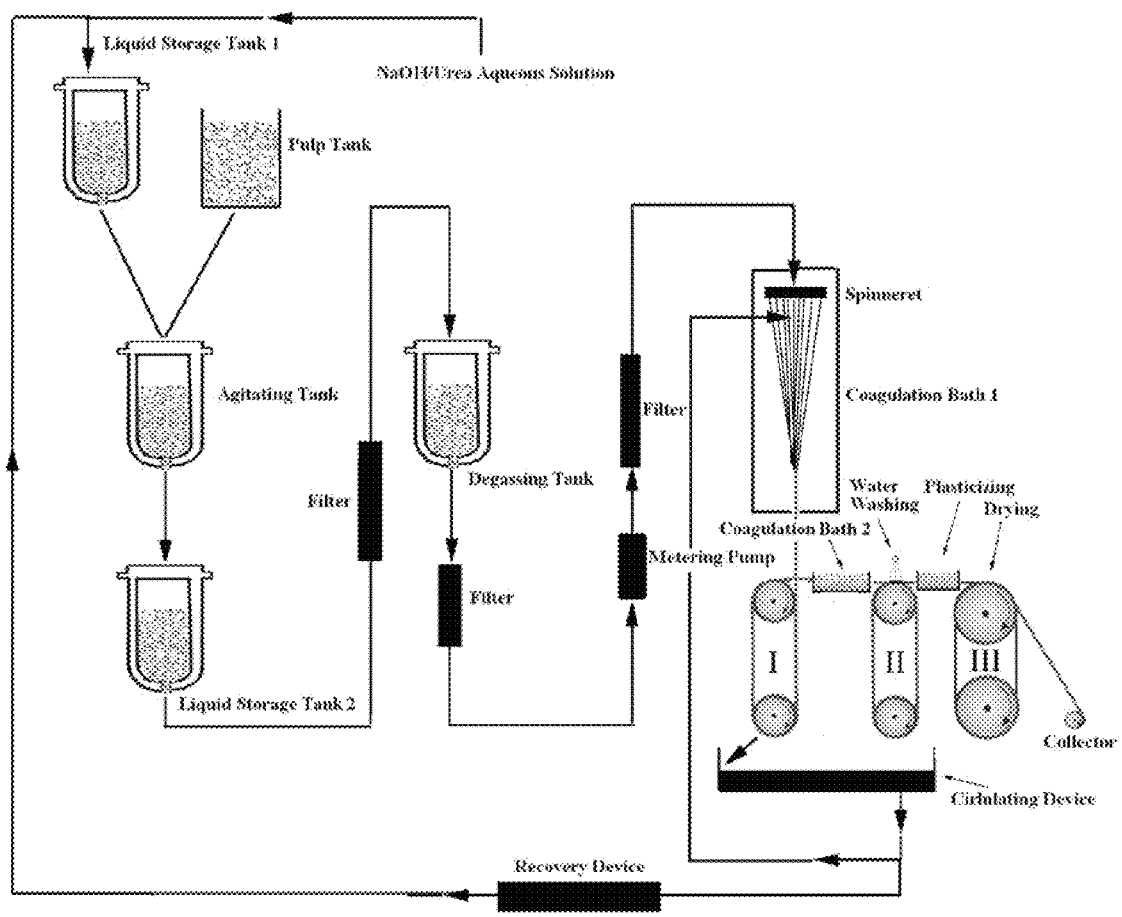
FIG. 2 shows a schematic diagram of a preferred embodiment of the process according to the present invention.

Referring to FIG. 2, the basic processing procedure of a preferred embodiment according to the present invention comprises: pre-cooling a mixed aqueous solution of 5 wt %~12 wt % sodium hydroxide and 8 wt %~20 wt % urea in a liquid storage tank 1 to a temperature in the range of −15° C. to −8° C., and then adding the pre-cooled solution into an agitating tank while adding a cellulose pulp from a pulp tank and stirring. Cellulose is dissolved rapidly during agitation to produce a transparent cellulose solution. The resulting cellulose solution is discharged into a liquid storage tank 2, passing a filter to remove impurities. Then the filtered cellulose solution is discharged into a degassing tank, deaerating continuously under vacuum for 4~24 hours. Herein, the deaerated cellulose solution is filtered by a filter, and then is pressed by a metering pump to be filtered again and jetted from a spinneret into a coagulation bath 1. The cellulose solution is coagulated and regenerated in the coagulation bath 1, and then pass through a roll I, a coagulation bath 2, a roll II, a plasticizer tank, a roll III (drying roll), to finally produce a regenerated cellulose filament on a bobbin. The coagulation baths are recycled by a circulation device, and also urea can be recycled by a recovery device.

EXAMPLE 1

Figure 3:
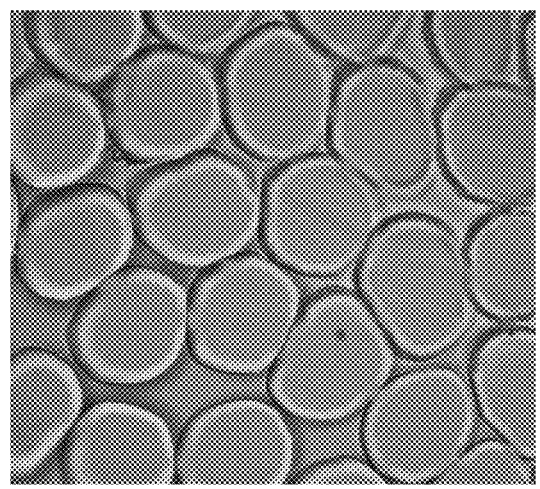
FIG. 3 shows a cross-section view of the cellulose filaments obtained according to the process of the present invention.
Figure 4:
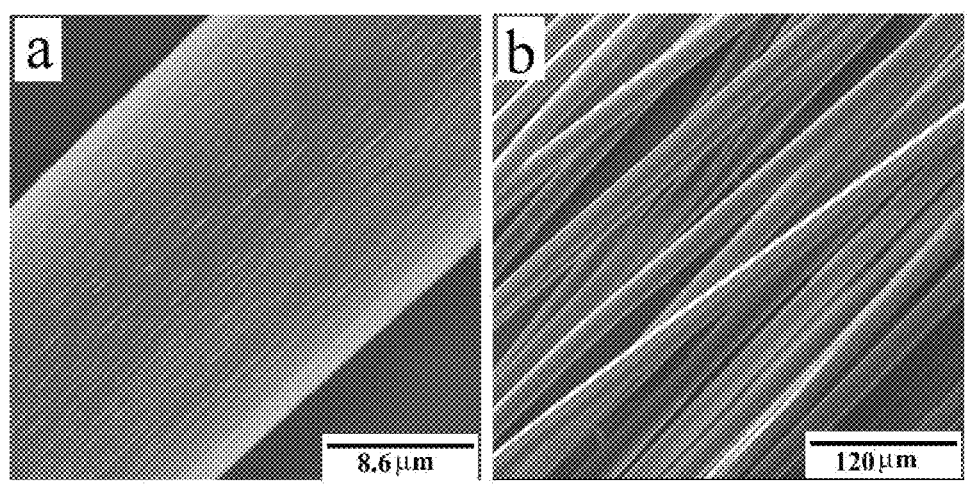
FIG. 4 shows a surface view of the cellulose filaments obtained according to the process of the present invention.
Figure 5:
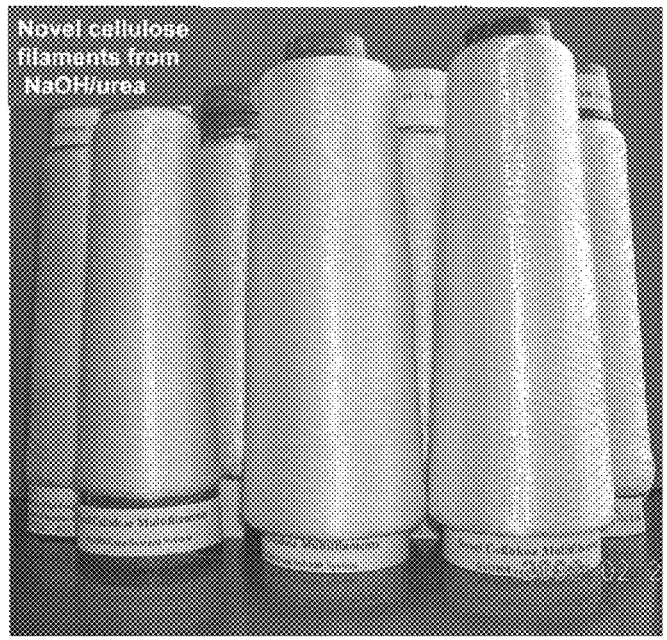
FIG. 5 shows packages of cellulose filaments obtained by the process according to the present invention.

3 kg of a mixed aqueous solution of 7.0 wt % NaOH/12 wt % urea (analytically pure) was pre-cooled to −12° C., then 151 g of dry cotton linter cellulose pulp (having a polymerization degree of 620) was added immediately, while stirring under 1000 rpm at room temperature for 20 minutes to dissolve the cellulose completely. A transparent cellulose solution was obtained by deaerating in a self-made deaeration tank under vacuum at 5° C. for 12 hours. The concentrated cellulose solution was pressed to pass through a 0.12 mm×30 holes spinneret of a spinning machine and entered into a first coagulation bath for solidification and regeneration, wherein the bath was a mixed aqueous solution of 8 wt % $H_2SO_4$/12 wt % $Na_2SO_4$, and the bath temperature was 10° C. Subsequently, the cellulose filaments entered into a second coagulation bath for regeneration, wherein the bath was an aqueous solution of 4 wt % $H_2SO_4$, and the bath temperature was 15° C. The stretched and regenerated cellulose filaments were washed with water and entered into a plasticizer tank for oiling, dried by a drying roll and then wound on a bobbin to form a spindle numbered as 1. The filaments had a round cross-section (FIG. 3) similar to Lyocell, smooth surface (FIG. 3), and soft and glossy appearance (FIG. 4), were free of sulfur and possessed excellent mechanical properties (Table 1).

EXAMPLE 2

3 kg of a mixed aqueous solution of 7.0 wt % NaOH/12 wt % urea (industrially pure) was pre-cooled to −12° C., and then 145 g of dry cotton linter cellulose pulp (having a polymerization degree of 620) was added immediately, while stirring under 1000 rpm at room temperature for 20 minutes to dissolve the cellulose completely. A transparent cellulose solution was obtained by deaerating in a self-made deaeration tank under vacuum at 5° C. for 12 hours. The concentrated cellulose solution was pressed to pass through a 0.12 mm×30 holes spinneret of a spinning machine and entered into a first coagulation bath for solidification and regeneration, wherein the bath was a mixed aqueous solution of 7.6 wt % $H_2SO_4$/12.5 wt % $Na_2SO_4$, and the bath temperature was 15° C. Subsequently, the cellulose filaments entered into a second coagulation bath for regeneration, wherein the bath was an aqueous solution of 4 wt % $H_2SO_4$, and the bath temperature was 15° C. The stretched and regenerated cellulose filaments were washed with water and entered into a plasticizer tank for oiling, dried by a drying roll and then wound on a bobbin to form a spindle numbered as 2. The filaments contained no sulfur as determined, and thus were fibers with high safety. The filaments had a round cross-section as well as soft and glossy appearance, and possessed relatively high strength.

EXAMPLE 3

3 kg of a mixed aqueous solution of 7.5 wt % NaOH/11 wt % urea (industrially pure) was pre-cooled to −12° C., and then 130 g of dry cotton linter cellulose pulp (having a polymerization degree of 440) was added immediately, while stirring under 700~1000 rpm at room temperature for 15 minutes to dissolve cellulose completely. A transparent cellulose solution was obtained by deaerating in a self-made deaeration tank under vacuum at 5° C. for 5 hours. The concentrated cellulose solution was pressed to pass through a 0.12 mm×30 holes spinneret of a spinning machine and entered into a first coagulation bath for solidification and regeneration, wherein the bath was a mixed aqueous solution of 8.6 wt % $H_2SO_4$/10.5 wt % $Na_2SO_4$, and the bath temperature was 10° C. Subsequently, the cellulose filaments entered into a second coagulation bath for regeneration, wherein the bath was an aqueous solution of 5 wt % $H_2SO_4$, and the bath temperature was 10° C. The stretched and regenerated cellulose filaments were washed with water and entered into a plasticizer tank for oiling, dried by a drying roll and then wound on a bobbin to form a spindle numbered as 3. The filaments had a round cross-section, were free of sulfur, had soft and glossy appearance, and possessed relatively high strength.

EXAMPLE 4

3 kg of a mixed aqueous solution of 7 wt % NaOH/12 wt % urea (industrially pure) was pre-cooled to −12° C., and then 130 g of dry cotton linter cellulose pulp (having a polymerization degree of 440) was added immediately, while stirring under 700~1000 rpm at room temperature for 15 minutes to dissolve cellulose completely. A transparent cellulose solution was obtained by deaerating in a self-made deaeration tank under vacuum at 10° C. for 5 hours. The concentrated cellulose solution was pressed to pass through a 0.12 mm×30 holes spinneret of a spinning machine and entered into a first coagulation bath for solidification and regeneration, wherein the bath was a mixed aqueous solution of 8.7 wt % $H_2SO_4$/10.9 wt % $Na_2SO_4$, and the bath temperature was 15° C. Subsequently, the cellulose filaments entered into a second coagulation bath for regeneration, wherein the bath was an aqueous solution of 5 wt % $H_2SO_4$, and the bath temperature was 15° C. The stretched and regenerated cellulose filaments were washed with water and entered into a plasticizer tank for oiling, dried by a drying roll and then wound on a bobbin to form a spindle numbered as 4. The filaments contained no sulfur as determined and were novel filaments with high safety. The filaments had a round cross-section, soft and glossy appearance, and relatively high strength.

EXAMPLE 5

3 kg of a mixed aqueous solution of 7 wt % NaOH/12 wt % urea (industrially pure) was pre-cooled to −12° C., and then 141 g of dry cotton linter cellulose pulp (having a polymerization degree of 440) was added immediately, while stirring under 700~1000 rpm at room temperature for 15 minutes to dissolve cellulose completely. A transparent cellulose solution was obtained by deaerating in a self-made deaeration tank under vacuum at 5° C. for 4.5 hours. The concentrated cellulose solution was pressed to pass through a 0.12 mm×75 holes spinneret of a spinning machine and entered into a first coagulation bath for solidification and regeneration, wherein the bath was a mixed aqueous solution of 10.5 wt % $H_2SO_4$/10.2 wt % $Na_2SO_4$, and the bath temperature was 13° C. Subsequently, the cellulose filaments entered into a second coagulation bath for regeneration, wherein the bath was an aqueous solution of 5 wt % $H_2SO_4$, and the bath temperature was 13° C. The stretched and regenerated cellulose filaments were washed with water and entered into a plasticizer tank for oiling, dried by a drying roll and then wound on a bobbin to form a spindle numbered as 5. The filaments had a round cross-section, were free of sulfur, had soft and glossy appearance, and possessed relatively high strength.

The mechanical properties of cellulose filaments obtained in the above examples were measured by XQ-1 constant-speed elongation type fiber strength tester. Their breaking strength and elongation at break in dry state were summarized in Table 1.

TABLE 1

Test results of mechanical properties such as breaking strength and elongation at break of cellulose filaments

| No. | Concentration of cellulose (wt %) | Polymerization degree of cellulose | Grade of chemical reagents | Tensile strength (cN/dtex) | Elongation at break (%) |
|---|---|---|---|---|---|
| 1 | 4.5 | 620 | Analytical grade | 1.8 | 13 |
| 2 | 4.4 | 620 | Industrial grade | 1.7 | 9 |
| 3 | 4.3 | 440 | Industrial grade | 1.9 | 2 |
| 4 | 4.2 | 440 | Industrial grade | 1.7 | 2 |
| 5 | 4.5 | 440 | Industrial grade | 2.0 | 2 |

It should be understood that all value ranges in the description and claims are intended to include their end values and all subranges within these ranges.

Although the present invention is illustrated and described with reference to the illustrative examples, those skilled in the art would understand that the present invention could be varied in manners and details without departing from the spirit and scope of the present invention. The protection scope of the present invention is defined as claimed in the appended claims.

What is claimed is:

1. A process for pilot-scale production of cellulose products, the process comprising:
    (a) pre-cooling a mixed aqueous solution of sodium hydroxide and urea to a first temperature of −15° C. to −8° C.;
    (b) placing the pre-cooled mixed aqueous solution at a second temperature of 0° C. to 20° C., and then adding a cellulose raw material which is thereby dissolved sufficiently under agitation to obtain a cellulose solution;
    (c) filtering and deaerating the cellulose solution; and
    (d) using a molding device for pilot-scale production to allow the filtered and deaerated cellulose solution to form a cellulose product, said molding device comprising a two-step coagulation bath spinning device comprised of a first coagulation bath and a second coagulation bath,
    wherein said filtered and deaerated cellulose solution first enters said first coagulation bath for initial processing and then enters said second coagulation bath for further processing,
    wherein said first coagulation bath is comprised of a mixed aqueous solution of $H_2SO_4$ and $Na_2SO_4$, wherein the concentration of $H_2SO_4$ is in a range of 5 wt % to 20 wt %, the concentration of $Na_2SO_4$ is in a range of 5 wt % to 25 wt %, and the bath temperature is in a range of 10 to 15° C., and
    wherein said second coagulation bath is comprised of an aqueous $H_2SO_4$ solution, wherein the concentration of $H_2SO_4$ is in a range of 3 wt % to 20 wt %, and the bath temperature is in a range of 0 to 60°.

2. The process according to claim 1, wherein in the mixed aqueous solution, the concentration of sodium hydroxide is in a range of 5.0 wt % to 12.0 wt %, and wherein the concentration of urea is in a range of 8.0 wt % to 20.0 wt %.

3. The process according to claim 1, wherein the said cellulose raw material is a cellulose pulp selected from the group consisting of cotton linter pulp, bagasse pulp, wood pulp and straw pulp.

4. The process according to claim 3, wherein the said cellulose pulp has a viscosity-average molecular weight of below $1.1 \times 10^5$.

5. The process according to claim 3, wherein said cellulose pulp has a polymerization degree of below 700.

6. The process according to claim 3, wherein said cellulose pulp has a polymerization degree of 250 to 650.

7. The process according to claim 1, wherein after the cellulose raw material being added at the second temperature, the agitation is performed for 10 minutes or more.

8. The process according to claim 1, wherein the concentration of the resulting cellulose solution is in a range of 3.0 wt % to 8.0 wt %.

9. The process according to claim 1, wherein in the mixed aqueous solution, the concentration of sodium hydroxide is in a range of 6.0 wt % to 8.0 wt %, and wherein the concentration of urea is in a range of 10.0 wt % to 20.0 wt %.

10. The process according to claim 1, wherein the said first temperature is in the range of −13° C. to −10° C.

11. The process according to claim 1, wherein after the cellulose raw material being added at the second temperature, the agitation is performed for 15 minutes or more.

12. The process according to claim 1, wherein the concentration of the resulting cellulose solution is in a range of 3.0 wt % to 7.0 wt %.

13. The process according to claim 1, wherein the cellulose products include regenerated cellulose products including filaments, chopped fibers, films, chromatographic packings and/or nonwovens.

14. The process according to claim 1, wherein the said first temperature is −12° C.

15. A process for pilot-scale production of cellulose products, the process comprising:

(a) pre-cooling a mixed aqueous solution of sodium hydroxide and urea to a first temperature;

(b) bringing the pre-cooled mixed aqueous solution to a second temperature that is higher than the first temperature;

(c) following (b), adding a cellulose raw material which is thereby dissolved sufficiently under agitation to obtain a cellulose solution;

(d) filtering and deaerating the cellulose solution; and (e) using a molding device for pilot-scale production to allow the filtered and deaerated cellulose solution to form a cellulose product, said molding device comprising a two-step coagulation bath spinning device comprised of a first coagulation bath and a second coagulation bath, wherein said filtered and deaerated cellulose solution first enters said first coagulation bath for initial processing and then enters said second coagulation bath for further processing, wherein said first coagulation bath is comprised of a mixed aqueous solution of $H_2SO_4$ and $Na_2SO_4$, wherein the concentration of $H_2SO_4$ is in a range of 5 wt % to 20 wt %, the concentration of $Na_2SO_4$ is in a range of 5 wt % to 25 wt %, and the bath temperature is in a range of 10 to 15° C., and wherein said second coagulation bath is comprised of an aqueous $H_2SO_4$ solution, wherein the concentration of $H_2SO_4$ is in a range of 3 wt % to 20 wt %, and the bath temperature is in a range of 0 to 60°.

16. The process according to claim 15, wherein the second coagulation bath has a temperature greater than the temperature of the first coagulation bath.

* * * * *